United States Patent Office 3,736,227
Patented May 29, 1973

3,736,227
NUCLEAR REACTOR FUEL ELEMENT SPACER
ASSEMBLY LOCK
Susumu Nakazato, Pittsburgh, Pa., assignor to Continental
Oil Company, Ponca City, Okla.
Filed June 1, 1970, Ser. No. 41,989
Int. Cl. G21c 3/34
U.S. Cl. 176—78                                    9 Claims

ABSTRACT OF THE DISCLOSURE

A nuclear reactor fuel element spacer arrangement has a fuel element supporting and spacing means through which respective fuel rods extend and which permits axial movement of the individual fuel rods while restraining them against lateral movement. In order to restrict axial movement of the spacer with respect to the entire assembly of rods, the fuel rod spacer is fastened to one of the fuel rods by a spring-loaded snap-in locking device. This prevents the fuel rod spacer distance along the fuel rods from being shifted as, for example, from fuel rod vibration or coolant drag force on the spacer or as a result of channel placement during installation.

---

This invention relates to nuclear fuel assemblies of the type comprising a bundle of elongated fuel elements, and more particularly to means for affixing the axial position of the spacer device in an assembly.

An assembly of fuel rods commonly comprises a number of fuel rods containing fissionable material in a parallel array and confined within an area, for example a square cross-sectional area, for the assembly. Provision has been made for coolant to flow past the spaced fuel rods within the space between rods and parallel to the axes of the rods so that the heat generated by the fissionable material in the rods is transferred to the coolant for such utilization as may be desired. The bundle of rods is ordinarily held at its opposite ends, and since the fuel rods have a degree of flexibility which would permit lateral motion at positions between the ends, it has been common to maintain the spacing pitch between rods and to restrict the lateral motion of the rods at positions between their ends while providing freedom for the individual rods to move axially under thermal expansion.

It is well known that restriction of lateral motion of the fuel rods is necessary to avoid undesirable effects such as neutron peaking and flow channelling which can cause hot spots to develop on the rods. A further reason for desiring lateral restriction is to dampen vibrations that can lead to undesired fretting of the fuel rods.

For the purpose of maintaining the fuel rods in their appointed positions and spacings in the assembly and for restriction of the lateral motion, grid-like spacers for the rods have been provided. Such spacers have generally been provided with suitable rod-positioning means including spring members which grip the rods to maintain them in a vertical position and properly spaced from each other and restricting lateral motion of the fuel rods while permitting axial movement of the rods relative to the spacer to take care of thermal expansion.

It has been found that the rod spacer may shift undesirably in its channel as a result of such factors as fuel rod vibration and coolant drag force on the spacer during operation, and sometimes as a result of placement of the channel during installation.

An object of the present invention is to restrict the freedom of axial movement of the spacer relative to the entire assembly of fuel rods while still permitting freedom of axial movement of individual rods.

The invention is carried out by locking the fuel rod spacer to at least one of the fuel rods of the bundle of rods. The axial position of the spacer is fixed by provision of a collar at the locking position of this particular rod, the collar being provided with means for engaging a suitable receiving means of the spacer so that this rod will be restrained from relative axial and rotational movement relative to the spacer.

Preferably the collar means is provided by segmenting this particular rod and joining longitudinal segments by a wafer fixed as by welding to the fuel rod tubing.

According to a preferred feature, the wafer is in the shape of a square with rounded corners and a cell of the grid structure is provided with suitable slots to receive the corners, thereby locking the rod to the spacer, by spring action.

The foregoing and other features of the invention will be better understood from the following detailed description and the accompanying drawings of which:

FIG. 4 is an isometric view, partly in cross-section, showing the fuel tube of FIG. 3 locked to a cell of the spacer of FIG. 2.

Figure 1:
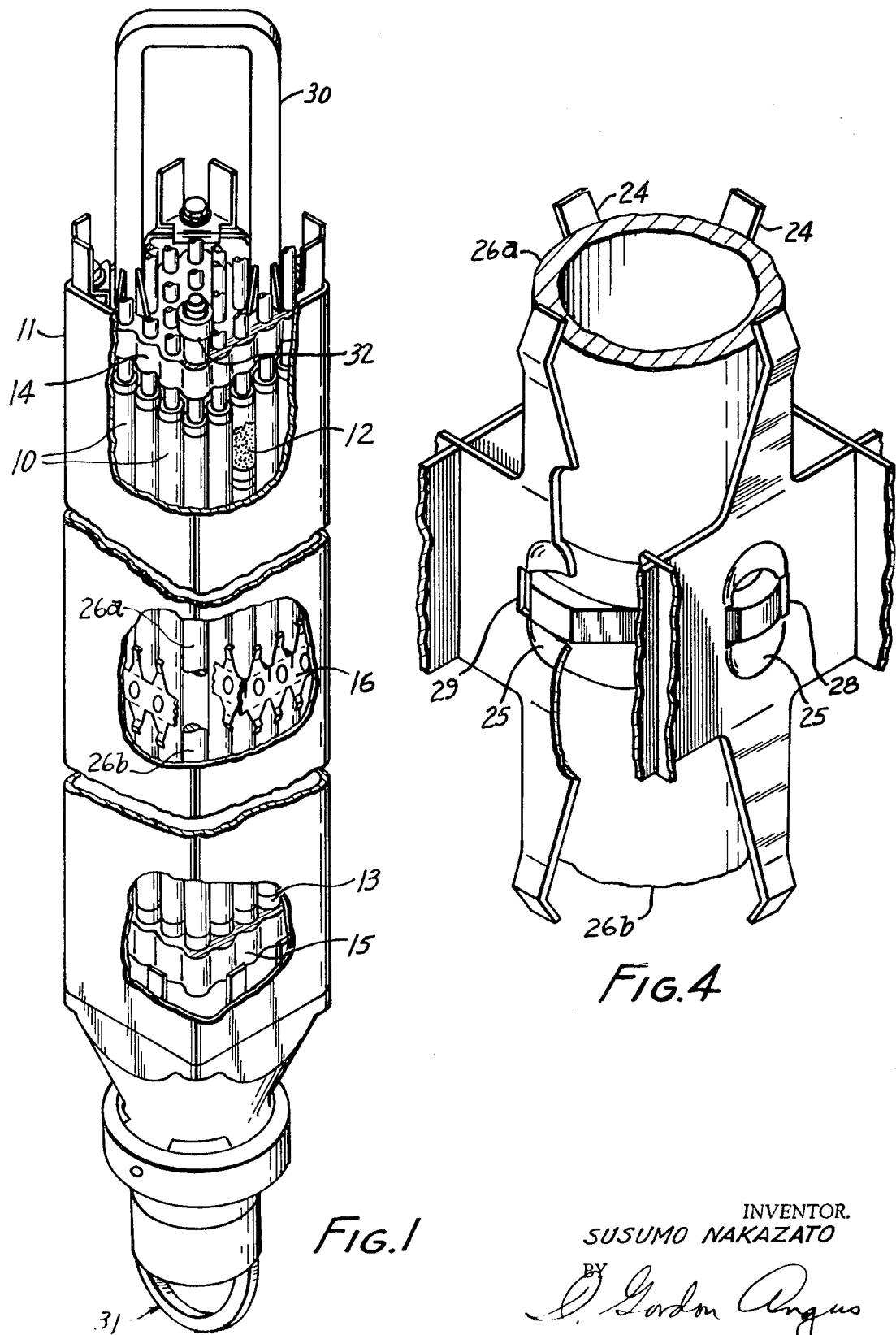
FIG. 1 is an isometric view of a nuclear fuel rod assembly within a channel and provided with a spacer, some of the parts being broken away for clarity of illustration.

FIG. 1 shows an assembly of a number of nuclear fuel rods 10 within a channel 11 which in this case is shown as having a square cross-section and arranged to hold the rods in a vertical position with the individual fuel rods spaced from each other and from the walls of the channel so that coolant fluid can flow through the channel vertically past the rods and receive heat from the nuclear reaction. The fuel rods 10 are ordinarily in the form of hollow tubes adapted to hold pellets of fissionable material 12. The fuel tubes 10 are shown closed at the top and bottom by suitable plugs 13, the upper plugs not being shown. The fuel rods are held in their proper spaced positions at their top and bottom by suitable holding means in the form of grid plates 14 and 15 fixed within the channel member 11.

As the fuel rods are relatively long compared to their diameter, and therefore flexible, they are provided at intermediate positions within the channels with suitable spacers 16 which restrict lateral movement of the fuel rods, and maintain the proper spacing between rods, the number of which spacers depending on the length of the rods. The maintenance of proper spacing of the fuel rods provides for each tube receiving its proper share of coolant fluid flow past it so that hot spots will not develop when heat is created by nuclear fission of the material in the fuel pellets by the neutron field from a suitable operating core.

Figure 2:
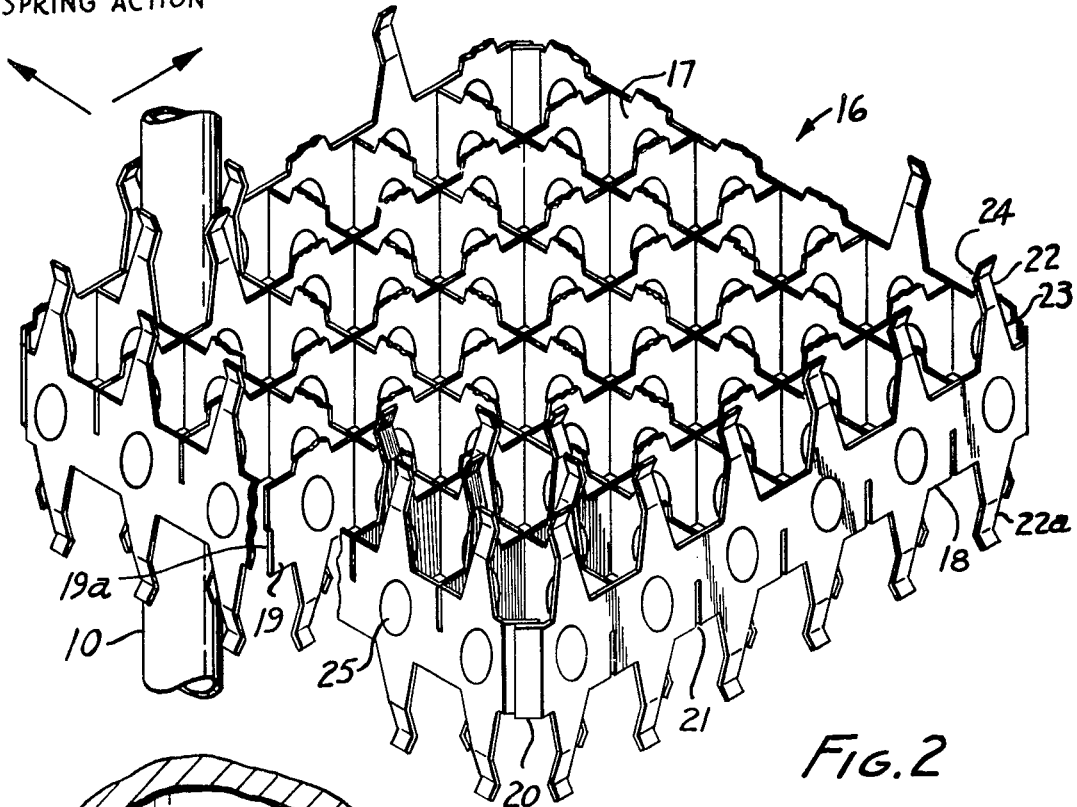
FIG. 2 shows a form of grid rod spacer which can be used in accordance with this invention.

A suitable grid spacer for this purpose is shown in FIG. 2 wherein the grid spacer 16 is adapted to support the fuel rods in their vertically extending position in an array within the area bounded by the outer sides of the grid structure, which form an enclosure having a substantially square shape conforming with the substantially square cross-section of the channel member 11 within which the grid structure is placed. Within the four sides defining the grid enclosure, there are formed a number of grid cells 17 of square cross-section, there being shown six such cells along each side, although it will be understood that some other number of cells could be used, and furthermore, the enclosure could be made rectangular by using more cells along one side than along the next, if that shape were needed to fit the shape of the channel. The parts forming this grid structure are made up of structural plates such as the side plates 18 and internal plates 19, the only difference between plates 18 and 19 being that the side plates are provided with end tabs 20 whereas the ends of plates 19 are structured to terminate flush with the sides of respective side plates.

Each plate 18 and 19 comprises a strip provided with parallel vertically extending slots 21 which extend halfway through the strip from one side thereof. Midway between each slot there extends from the plate an upwardly extending leaf spring finger 22 and a similar downwardly depending leaf spring finger 22a, there being also a pair of leaf spring fingers 22 and 22a between the end slots and the ends of the plate. The upper and lower spring fingers are inclined somewhat away from the plane of the plate at position 23 at the end of which there is formed a crook or bend 24 protruding still further from the plane of the plate. The body of the plate is provided with a plurality of protuberances in the form of dimples 25 protruding out of the plane of the plate at the opposite side from the bends 24. Thus the members 25 are in effect hollows or dimples at one side of the plate, and protuberances at the other side of the plate.

The sides of the square are formed by joining the oblique tab ends of four plates 18, all of equal length, with adjacent plates perpendicular to each other. Two opposite plates of the square have their slots extending down from the top and the other two opposite plates have their slots extending up from the bottom. The proper number of internal plates 19 will then be used to complete the cellular structure within the square. Since there are six cells to a side in the structure shown, there will be needed a set of five of the plates 19 extending parallel to each other between two opposite sides of the square and an additional set of five plates 19 extending parallel to each other between the other two opposite sides of the square. The five parallel plates 19 of one of these sets are placed with their slots extending upwardly from the bottom, these being the plates extending from lower left to upper right in FIG. 2. The other set of five parallel plates 19 extending perpendicular thereto have their slots depending down from the top. The arrangement is such that the unslotted parts of plates 19 fit within the slots of the plates 19 which they cross, and the end of plates 19 fit within respective slots of side plates 18. The ends of plates 19 which are in the slots of side plates 18 terminate flush with the outer sides of side plates 18. To permit this assembly the ends of plates 19 are suitably notched at 19a to accommodate the side plates 18. The assembly is secured to form a rigid structure by suitably welding or brazing the grid cell corners and the corners of the plates forming sides of the square. This will also serve to seal the corners to prevent crevice corrosion.

By this arrangement the bends 24 of all of the leaf springs of all the plates extending from lower left to upper right (FIG. 2) protrude in one direction into the regions above and below the cells of the grid and the bends 24 of all of the leaf springs of all the plates perpendicular thereto likewise all protrude in the same direction into the regions above and below their cells but different from the direction of the bends of the springs of the plates which extend from lower right to upper left, thereby giving spring actions in the directions of the two arrows labeled "spring-action." The arrangement also provides that the dimple protuberances 25 will all protrude into their respective cells in the directions opposite the protrusions of the springs. Hence, two adjacent sides of each square cell will be provided with protruding springs and the other two adjacent sides of each cell will have protruding protuberances.

The dimensions of the cells and the positions of the springs and protuberances are such that each cell can be provided with a fuel rod 10 substantially centered within its cell with space all around the rod inside the cell wall, except for the protuberances, and extending through the cell in a vertical direction. The relative dimensions of the fuel rods and the parts of the cell are such that the springs which are protruding will exert an effective spring action against the side of the rod, urging the rod against the protuberances on the two other sides of the cell.

In this arrangement only the bends 24 of the springs which are protruding engage the fuel rod, as the springs at the opposite sides of the cell will not engage this fuel rod, although they will engage the fuel rod in the next adjacent cell.

Ordinarily there will be more than one of the grid spacers located vertically apart from each other in a nuclear fuel rod assembly, the number of the grid spacers depending upon the length of the fuel rods.

A suitable material for the grid plates is Inconel. After the brazing operation, the grid will ordinarily be age-hardened to obtain the spring property. The provision of the leaf springs above and below the cells serves to maintain a perpendicularity of the fuel rods with the mid-plane of the support grid.

Since the grid spacer 16 is not ordinarily positively fastened to all of the fuel rods which pass through it, nor to the side wall of the channel 11, it would be possible for the spacer to become moved up or down in the channel from its desired vertical position unless some means is provided for preventing such movement of the grid spacer.

Figure 3:
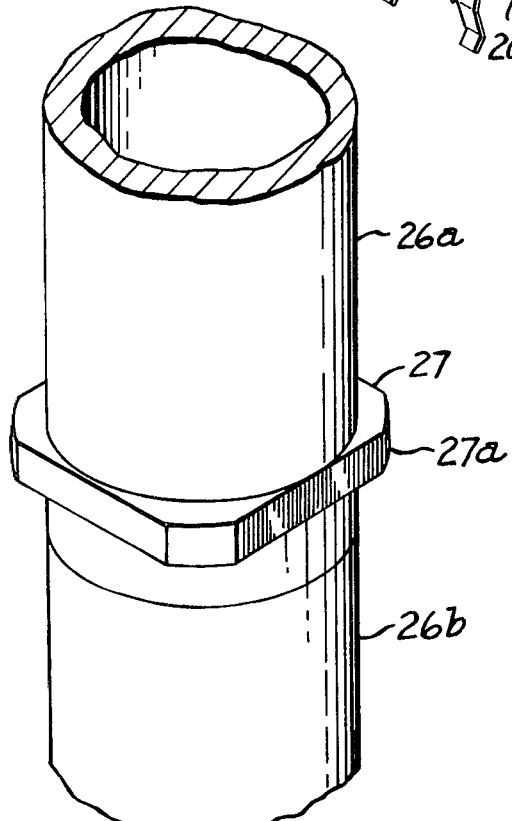
FIG. 3 is an isometric view of part of a segmented fuel tube provided with a locking wafer according to this invention.

Means is provided for preventing such undesired movement of the grid spacer as shown in FIGS. 3 and 4. For this purpose one of the fuel rods which extends through a cell of the spacer is constructed in segmented form as shown by the tube segments 26a and 26b. FIG. 3 shows the portion shown broken away in FIG. 1. The lower end of this segmented rod is fixed to the lower grid plate as by screw threads, the upper end having a collared nut 32 threaded to it which bears down on the upper grid plate 14. The open lower end of the upper segment 26a is closed by a wafer plug 27 to which it is fixed as by welding, thereby closing the bottom of segment 26a, and the lower side of wafer plug 27 is similarly fixed as by welding to the open top of tube segment 26b. This fuel rod or tube will be built up with as many segments and wafers as correspond with the number of grid spacers to be used in the assembly, that is, there will be as many wafers as there are grid spacers. The wafer portions of plugs 27 have their sides substantially tangential with the outer surfaces of the fuel tubes 26a and 26b, so that their corners protrude outwardly from the tube, and these corners are preferably rounded as shown at 27a to facilitate a locking action as will presently appear.

The particular grid cell which receives the segmented tube of FIG. 3 is structured to receive the locking wafer 27. This structure comprises horizontally extending slots 28 and 29 cut through the two dimples 25 in the walls of the cell which are opposite the protruding bends 24 of the springs, as shown in FIG. 4. The dimensions are such that the fuel rod with its wafers will pass through the cell when the corners of the wafers are aligned with the corners of the cell. The fuel rod will then be brought into the proper vertical position, which places the wafer at the level of the slots of the dimples. A forty-five degree turn of the fuel rod will then cause the wafer corners to snap into their respective slots 25, the snapping action being provided by the protuberances 24 of the upper and lower springs which urge the fuel rod and its wafer toward the protuberances inside the cell, of the opposite slotted dimples. This will hold the rod against rotation, and will also prevent relative axial movement between the rod and the grid spacer.

In this position, the segmented fuel rod is held in a manner similar to the other fuel rods in their cells, that is, the upper and lower spring fingers having the protruding bends 24 will urge the circumference of the fuel rod against the protuberances 25 which are opposite those protruding bends. The removal of the fuel rod when desired, can be accomplished by a suitable tool that will force the wafer corner out of the slots against the force of the finger springs to disengage the wafer corners from the slots of the dimples, and allow rotation of the wafer corners toward alignment with the corners of the cell so that the rod may be removed.

During operation, coolant flows into the channel at the bottom and out at the top. The upper U-member 30 serves as a handle and the lower U-member 31 serves as a guide during insertion into the system.

It will be recognized that by this invention there is provided an arrangement for supporting and spacing a bundle of fuel rods in a reactor in a manner to provide uniform coolant flow past all the rods, with assurance that the spacing means will maintain its position and thereby maintain the positions of the fuel rods. This invention and result are carried out moreover without the use of more cumbersome arrangements heretofore used, such as welding of a rod to a spacer, or the use of tie wires for a similar purpose, or other cumbersome means.

It will be recognized that modifications may be made without departing from the scope of the invention. For example, the rod having the locking collar or flange need not contain fuel, although it will normally be desirable for it to contain fuel. Furthermore, more than one of the rods may be provided with a locking wafer, with corresponding provision of slots at the corresponding cell of the grid spacer.

What is claimed is:

1. In a nuclear reactor fuel assembly of parallel spaced fuel rods supported within a channel at an intermediate position of their length by spacer means which maintains the spacing of the rods and restricts their lateral movement while permitting their axial movement relative to the spacer, means for maintaining the position of the spacer within the channel comprising a locking fuel rod having a collar means intermediate its length, said collar means being provided with locking means, said spacer having a cell through which the locking fuel rod extends, said cell having spring means and protuberance means, said spring means urges the locking fuel rod against the protuberance means wherein said collar means engages said protuberance means, said protuberance means having means which engages the locking means of said collar means to lock the locking fuel rod against rotation and axial movement relative to the spacer means.

2. Apparatus according to claim 1 in which the locking means is an extension means on the collar means and the means which engages the locking means is a slot means formed on the protuberance means.

3. Apparatus according to claim 2 in which the extension means comprises a corner on the collar means and the slot means comprises a horizontally extending slot in the protuberance means.

4. Apparatus according to claim 2 in which the protuberance means comprises dimples formed in the cell.

5. Apparatus according to claim 1 in which the locking means comprises corners of the collar means, and the spring means comprises spring fingers which extend above and below the cell and having respective protruding parts which bear against the locking fuel rod above and below the cell, and the protuberance means comprises dimples within the cell opposite the spring fingers against which the rod is urged by the spring fingers, and the corners of the collar extend outward from the rod, and the means engaging the locking means comprises slots in said dimples into which said corners are urged when the locking rod is rotated to a position where the corners are juxtaposed to the slots.

6. Apparatus according to claim 5 in which the cell is square and the spring fingers are at adjacent sides of the square and there are dimples at the other two adjacent sides of the square.

7. Apparatus according to claim 6 in which the slots extend horizontally and one of the slots is longer than the other.

8. Apparatus according to claim 6 in which there is a dimple in each of the sides of the square, each dimple protruding into the cell with a segmented fuel rod having a slot, and the collar has four corners adapted to snap into the respective slots under action of the spring fingers.

9. Apparatus according to claim 8 in which the collar is a wafer fixed between adjacent sections of the locking fuel rod.

References Cited

UNITED STATES PATENTS

| | | | |
|---|---|---|---|
| 3,442,763 | 5/1969 | Chetter et al. | 176—78 |
| 3,205,144 | 9/1965 | Jabsen | 176—78 X |
| 3,510,397 | 5/1970 | Zettervall | 176—78 |
| 3,356,587 | 12/1970 | Heck | 176—78 |
| 3,301,764 | 1/1967 | Timbs et al. | 176—78 |
| 3,255,091 | 6/1966 | Frisch | 176—78 |
| 3,379,617 | 4/1968 | Andrews et al. | 176—78 |

CARL D. QUARFORTH, Primary Examiner

G. G. SOLYST, Assistant Examiner

U.S. Cl. X.R.

176—81